United States Patent [19]

Gray

[11] Patent Number: 4,579,794
[45] Date of Patent: Apr. 1, 1986

[54] STABLE HIGH DRAIN BATTERY

[75] Inventor: Richard T. Gray, Levittown, Pa.

[73] Assignee: Rohm and Haas Company, Philadelphia, Pa.

[21] Appl. No.: 199,141

[22] Filed: Oct. 22, 1980

[51] Int. Cl.$^4$ .................. H01M 4/60; H01M 10/40
[52] U.S. Cl. ................................ 429/194; 429/213
[58] Field of Search .................. 429/194, 197, 213

[56] References Cited

U.S. PATENT DOCUMENTS

| 3,907,597 | 9/1975 | Mellors | 429/197 |
| 4,128,702 | 12/1978 | Okaniwa et al. | 429/213 |
| 4,181,779 | 1/1980 | Teo | 429/199 |
| 4,321,114 | 3/1982 | MacDiarmid et al. | 429/213 |

FOREIGN PATENT DOCUMENTS

| 2146947 | 7/1971 | France | 429/213 |
| 1216549 | 12/1970 | United Kingdom | 429/213 |

OTHER PUBLICATIONS

Jozefowicz, Conductivity of High Polymer Compounds in the Solid State, Fast Ion Transport in Solid--Solid State Batteries and Devices, Proceedings of the NATO Sponsered Advanced Study Institute, Belgirate, Italy, pp. 623–636 (1973).

Yoshimura, Molecular Metals, edited by William E. Hatfield, NATO Conference Series VI: Materials Science, 1978, pp. 471–489.

MacDiarmid et al., Organic Coatings and Plastic Chemistry, vol. 43, 1980, pp. 853–856.

Chen et al., Polyacetylene,(CH)$_x$: Photoelectrochemical Solar Cell, Appl. Phys. Letter 36(1) Jan. 1, 1980, pp. 96–98.

Primary Examiner—Donald L. Walton
Attorney, Agent, or Firm—Marc S. Adler

[57] ABSTRACT

A substantially anhydrous cell comprising an anode, a cathode comprising a mixture of polyacetylene and an electrically conductive material, said conductive material being present in an amount of from about 5% to about 75%, based on the total weight of the cathode, an electrolyte capable of p-doping said cathode, and an organic solvent for said electrolyte, said cathode being insoluble in said solvent when said cathode is either undoped or p-doped, said solvent being stable to electrochemical decomposition, and said anode and said solvent being substantially inert to one another.

21 Claims, No Drawings

STABLE HIGH DRAIN BATTERY

BACKGROUND OF THE INVENTION

This invention relates to a cell. More particularly, this invention relates to a cell having a high drain and an enhanced efficiency measured in watt-hours per pound.

In any battery or cell, the amount of electricity produced is dependent on a number of factors. One of these factors involves the cathode. The cathode is composed of an electronegative material associated with an electrically conductive support. Thus, the electric power capable of being produced (watt-hours) from the cell is related to the amount of electronegative material associated with the electrically conductive support.

A factor which influences the current produced by the cell is the solvent for the electrolyte. The speed of ionic migration in the electrolyte solvent will determine the rate of electrical output. In order to have a high drain cell, an electrolyte solvent should be used which will permit a high rate of ionic migration of the electrolyte ions. Further, it is also important that the electrolyte solvent not leach material from the cathode.

A cathode must perform two functions. First, the cathode must provide the electron-transfer half-reaction, the other half-reaction being provided by the anode. Second, the cathode must transport into and distribute electrons within itself during discharge of the cell in order to be an effective cell.

A cell which contains a polyacetylene cathode offers many advantages. Although the polyacetylene cathode performs both of the functions set forth above, it has been found that the polyacetylene cathode will, with the passage of time, suffer from a diminished ability to transport into and distribute electrons within itself during discharge of the cell (i.e. loss of electrical conductivity). When this happens, the effectiveness of the cell is diminished.

For some electrical applications, such as an electric automobile, because of the weight of the object to be activated by a cell, the watt-hours per pound of cell is a critical factor and the drain rate is also a critical factor. The electrical conductivity stability of the cathode is, however, important for all electrical operations.

Polyacetylene and p-doped polyacetylene and their methods of preparation are described in the Journal of Polymer Science, Volume 12, pages 11 through 20, Shirakawa, et al (1974); Trans. Faraday Society, Volume 64, pages 823 through 828, Berets, et al (1968); in a paper presented at the Advanced Study Institute on the Physics and Chemistry of Low Dimensional Solids—Tomar, Portugal, Aug. 26–Sept. 7, 1979, and entitled Organic Metals and Semi-conductors: The Chemistry of Polyacetylene, $(CH)_x$, and Its Derivatives, MacDiarmid and Heeger; and in an IBM review paper presented at San Jose, California, April 1979, and entitled Organic Metals and Semi-conductors: The Chemistry of Polyacetylene, $(CH)_x$ and Its Derivatives, MacDiarmid and Heeger. The disclosure of these papers are incorporated herein by reference. It is known, from these papers, that polyacetylene is minimally electrically conductive and that the electrical conductivity of polyacetylene may be increased by p-doping.

U.S. Pat. No. 3,907,597 is directed to a non-aqueous cell having an anode such as lithium, a cathode such as fluorinated carbon or copper sulfide, an electrolyte such as lithium perchlorate, and an electrolyte solvent such as sulfolane, or 3-methylsulfolane plus at least 20% by volume of a cosolvent which is mandatory and which reduces the viscosity of the sulfolane or 3-methylsulfolane. The '597 patent also discloses electrolyte solvents such as propylene carbonate, ethylene carbonate, gamma-butyrolactone, ethylene glycol sulfite, and dioxolane. This patent also teaches, that it is practically impossible to predict in advance how well, if at all, a non-aqueous electrolyte (meaning sulfolane and the other solvents set forth above) will function with a selected anode-cathode couple. The '597 patent further discloses that the parts of one cell (cathode, anode and electrolyte) are not predictably interchangeable with parts of another cell to produce an efficient and workable cell. The '597 patent fails to teach or suggest a cell having a cathode which is a mixture of polyacetylene and an electrically conductive material.

It is an object of this invention to provide a superior cell having a polyacetylene containing cathode with stable electrical conductivity properties.

An additional object of this invention is to provide a cell having a high drain rate.

Another object of this invention is to provide a cell having an enhanced efficiency as measured in watt-hours per pound of cell and a high drain rate.

Other objects and advantages will become apparent from the following more complete description and claims.

DETAILED DESCRIPTION

Broadly this invention contemplates a substantially anhydrous cell comprising an anode, a cathode comprising a mixture of polyacetylene and an electrically conductive material, said conductive material being present in an amount of from about 5% to about 75% based the weight of the cathode, an electrolyte capable of p-doping the cathode and an organic solvent for said electrolyte, said polyacetylene cathode being insoluble in said solvent when said cathode is either undoped or p-doped, said solvent being stable to electrochemical decomposition, and said anode and said solvent being substantially inert to one another.

It is now been found that a cell having a solid anode a cathode comprising polyacetylene and an electrically conductive material, an electrolyte and an organic solvent for said electrolyte not only exhibits electrical conductivity stability, but is also extremely efficient in that the energy density of said cell, measured in watt-hours per pound, depending on the materials used, is high. Additionally, the drain rate of such cell is high so that a large amount of electrical energy is available on demand. Further, the cell may be a primary cell or a secondary cell (capable of being recharged).

The anode of the cell may be composed of any electropositive material having an oxidation potential equal to or more positive than lead such as cesium, rubidium, potassium, sodium, barium, lithium, strontium, calcium, magnesium, yttrium, scandium, beryllium, aluminum, zirconium, manganese, zinc, iron, lead, and their alloys (e.g. a lithium-aluminum alloy) and the like.

It is preferred, however, to use lithium, or its alloys, as the anode because it is most weight efficient, produces a high voltage and lithium salts tend to be more soluble than other metal salts in the electrolyte solvents.

The cathode is composed of polyacetylene and an electrically conductive material. When the cathode is electrochemically doped, it then becomes a p-doped, cathode. Any cathode of a cell, must perform two functions. The cathode must provide the electron-transfer half-reaction (the other half-reaction is provided by the anode) and additionally, must have sufficent electrical conductivity to collect and transport these electrons. Polyacetylene initially performs both of these functions. However, after a period of time, the electrical conductivity of polyacetylene decreases. The polyacetylene however, does not lose the ability to provide the electron-transfer half-reaction. The import of this is that a cell having a polyacetylene cathode will, after a period of time, have increased internal resistance and consequently a reduced drain rate. When this happens, the efficiency of the cell for its intended purpose is adversely affected. The present invention provides a cell having a cathode which is a composite of polyacetylene and an electrically conductive material. In this manner, although the polyacetylene loses electrical conductivity, it does not lose its ability to provide the electron-transfer half-reaction. By providing a cathode composed of an electrically conductive material and polyacetylene, the cell life becomes vastly improved and rechargeability of the cell is enhanced because, the electrically conductive material performs the function of electron transport and the polyacetylene continues to perform its function of providing the electron-transfer half-reaction even though the polyacetylene, after a period of time, no longer itself fully performs the function of electron transport.

The electrically conductive material, in order to be useful in this invention, should have a stable electrical conductivity of at least about $10^{-6}$ (ohm-cm)$^{-1}$. Additionally, the electrically conductive material must be completely insoluble in the electrolyte solvent and must be electrochemically inert under the strong oxidizing conditions present during recharge of the cell and the milder reducing conditions present during discharge of the cell.

The electrically conductive material used in this invention will also be determined by the intended function of the cell. For example, for a heart pace maker, the cell utilized generally has a low drain. In such a case, an electrically conductive material having a minimal electrical conductivity could be utilized. In other applications, such as an electric car, the cell must have a high drain and a more electrically conductive material, such as a carbon, would be used.

Any electrically conductive material may be used which meets the requirements set forth above and which can be intimately associated with the polyacetylene matrix so as to provide stable electrical conductivity throughout the cathode.

Among the electrically conductive materials which may be used are the carbons such as carbon black, acetylene black, graphite and the like and mixtures thereof.

Other electrically conductive materials may also be used, provided they meet the requirements set forth above. These other materials may be gold, platinum paladium, rhodium, silver, mercury, selenium, silicon and conductive polymers, such as polypyrrole and poly(sulfur nitride).

The amount of electrically conductive material which is associated with the polyacetylene may vary from about 5% to about 75% by weight of the electrically conductive material based on the total weight of polyacetylene plus electrically conductive material. It is not desired to have less than about 5% of the electrically conductive material present because stable electrical conductivity and intimate association may be adversely affected. It should be understood however, that it is preferred to use the minimum amount of electrically conductive material necessary to achieve stable electrical conductivity of the cathode as well as intimate association of the electrically conductive material with the polyacetylene matrix because such minimum amount will only minimally increase the cell dead weight. Amounts in excess of 75% are also not desired because such excessive amounts will only add to the cell dead weight and will therefore adversely affect the energy density of the cell.

In a particularly preferred embodiment, polyacetylene powder is mixed with a carbon, such as carbon black or graphite.

When polyacetylene powder and a powdered electrically conductive material are mixed together, the electrically conductive material should have a particle size such that intimate mixing of the electrically conductive particles with the polyacetylene particles will be accomplished. In the battery art, when powdered materials are used such powdered materials generally have a particle size of, for example, 30 millimicrons.

When the cathode is prepared from polyacetylene powder and an electrically conductive powder material, after intimate mixing of the powders, it is often desirable to compress the powder mixture so that it can be more easily handled. Alternatively, the powder mixture may be poured on a support which is to serve as a separator in the cell. Additionally, the powder mixture may be compressed into a disc.

When polyacetylene film is being prepared, the film forms on the catalyst which is used in the preparation. Therefore, it is possible that the catalyst may be intimately mixed with an electrically conductive material or may be impregnated on an electrically conductive material so that the polyacetylene, when prepared, will form as a film in intimate contact with such electrically conductive material.

The cathode may be electrochemically p-doped in a manner similar to that disclosed in the Journal of the Chemical Society Chemical Communications, #14, page 594, Nigrey et al., July, 1979.

In practicing this invention, a cell may be constructed having a lithium anode, a polyacetylene electrically conductive material mixture as the cathode and an electrolyte of lithium hexafluorophosphate dissolved in sulfolane. Thereafter, when a current is passed through the cell the cathode is p-doped with hexafluorophosphate ions. In practice, the electrochemical p-doping is continued until the desired charge is obtained, as measured by an ammeter. From the above, it is apparent that it is the electrolyte which is responsible for the p-doping of the cathode.

Alternatively, one may utilize a cathode, according to this invention, which has been p-doped prior to assembly in a cell.

The electrolyte used must be soluble in the electrolyte solvent, preferably in an amount of at least 5% by weight of the electrolyte solvent and more preferably at least 20% soluble in said solvent, and even more preferably 40% soluble and most preferably even more than 40% soluble. When the electrolyte used is less that 5% soluble in the electrolyte solvent, the effectiveness of the cell decreases. For example, when the electrolyte used is less than 1% soluble, a minimally effective cell is obtained.

Generally, the greater the solubility of the electrolyte in the solvent, the more efficient will be the cell. Among the electrolytes which may be used are the salts of perchlorates, tetrafluoroborates, hexafluorophosphates, hexafluoroarsenates, hexafluoroantimonates, fluorosulfonates, trifluoromethane sulfonates, and the like.

Although any metal salt may be used which meets the solubility criteria set forth above, it is preferred that the electrolyte salt be a salt of the metal used in the anode. This is particularly desirable when the cell is to be a secondary cell.

The solvent for the electrolyte may be any organic solvent in which the electrolyte is soluble, as aforestated, but one in which the p-doped and undoped cathode is insoluble.

The solvent which is used must be substantially inert to both the cathode and anode, must be capable of dissolving the electrolyte in at least the minimum amounts set forth herein and must be stable to electrochemical decomposition.

The solvents which may be used are sulfones including clyclic sulfones, ethers including cyclic ethers, organic carbonates including cyclic carbonates, esters, lactones, organic sulfites and the like.

Among such organic solvents may be mentioned propylene carbonate, sulfolane, dimethoxyethane, bis (methoxyethyl) ether, dioxane, 3-methylsulfolane, tetrahydrofuran, 2-methyltetrahydrofuran, dioxolane, ethylene carbonate, methyl formate, butyrolactone, dimethyl sulfite, and the like.

The cell is generally assembled under anhydrous conditions to eliminate the deleterious effect of water in connection with the operation of the cell.

The cell itself may be a thin cell, even a paper thin cell, so that a multitude of layers may be disposed one on top of the other and connected to one another in series or in parallel, or, a single length of the cell may be rolled up upon itself or into a helix.

In the examples which follow, watt-hours were calculated according to the formula:

Watt-hours = Voltage × Amp Hours

The value for the voltage was taken to be 3 volts.

Watt-hours/pound is calculated by dividing Watt-hours by the assumed cell weight given in the examples. The assumed cell weight is based on the amounts of materials necessary for the given weight of polyacetylene present plus a dead weight factor. This is reflected in the total cell weight given in the examples.

GENERAL PROCEDURE

Each cell set forth in the examples is assembled in a dry box under an argon atmosphere. The cell is connected to a direct current source through which the metal anode is negatively charged and the cathode is positively charged. Additionally, the cell is connected to a volt meter and an ammeter.

The charging voltage is recorded from the volt meter and the current is recorded from the ammeter. After charging, the cell is then discharged, unless indicated otherwise, under short-circuit conditions through an ammeter. During discharge, the milliamp-minutes is recorded based on periodic ammeter readings. The watt-hours per pound, when given, is then calculated as aforesaid.

In all of the examples, an excess of the anodic material, electrolyte and solvent is used. The term "excess" refers to an amount beyond the amount required for the particular example based on the amount of polyacetylene present in the cathode.

In order to more fully illustrate the nature of this invention and the manner of practicing the same, the following examples are presented.

EXAMPLE 1

The apparatus used in Example 1 consisted of a Plexiglas ® acrylic plastic sleeve having a circular internally threaded top portion, a lower portion having a circular internally smooth wall, a smooth annular shoulder extending at a right angle from the end of the internal smooth wall remote from the threaded portion and a circular orifice downwardly extending from the end of the shoulder opposite the smooth wall is disposed, from bottom to top, a gold plated aluminum anode contact which rests on the shoulder and extends through the orifice. The anode contact has a lead connected to the power source and to the ammeter and volt meter. On top of the anode contact is a lithium anode. On top of the lithium anode, as a separator is coarse Whatman filter paper. The filter paper is wetted with an electrolyte dissolved in an electrolyte solvent. On top of the coarse filter paper is the cathode. On top of the cathode is a gold plated aluminum cathode contact which has a lead which is also connected to the power source and to the ammeter and volt meter. The cathode contact is also threaded to mate with the internal threads of the top portion and is screwed down tightly. The cathode chamber area is about 3 cm$^2$.

In the aforedescribed device is placed a cathode. The cathode is prepared by mixing, by weight, 90% polyacetylene powder and 5% carbon powder in a K-mill and thereafter adding 5% graphite flakes and again mixing the composition. One milliliter of a saturated solution of lithium hexafluorophosphate dissolved in sulfolane is placed on the separator. On top of the separator wetted with the sulfolane solution is placed from 50 to 100 milligrams of the aforedescribed polyacetylene-carbon mixture. The cathode contact is then screwed down. During the screwing down of the cathode contact, brief short-circuit current measurements are made. The current bursts rose from 8 milliamps to between 20 to 30 milliamps before falling back, whereupon the cathode contact was loosened slightly. The system is charged at 4.5 volts until the current drops to less than 10 milliamps from 60 to 100 milliamps. Charging is discontinued when the current drops below 10 milliamps. Initial short-circuit currents were 150 to 200 milliamps (50–67 milliamps/cm$^2$). After allowing the cell to stand overnight, the open circuit voltage was 3.4 volts. This experiment is discontinued because the sulfolane attacked the Plexiglas ® acrylic sleeve. Nevertheless, this example indicates a high drain rate for a lithium cell.

EXAMPLE 2

The procedure of Example 1 is repeated except that 500 milligrams of polyacetylene powder is mixed with 175 milligrams of graphite flakes and 25 milligrams of carbon powder. About 50 milligrams of this mixture is used as the cathode. A charging voltage of 4.5 volts results in a current of 25 milliamps. When the current drops below 5 milliamps, recharging of the cell is discontinued. Using a 250 microamp drain rate, the voltage falls from 3.85 volts to 3.55 volts over a period of 7 hours. The experiment is discontinued due to the attack of sulfolane on the Plexiglas ® sleeve. Nevertheless this example shows a high voltage under drain for a cell.

EXAMPLE 3

1.74 grams of polyacetylene powder and 0.25 gram of graphite powder is mixed together in a K-mill. 100 milligrams of this mixture is placed into a Soxhlet thimble and a carbon rod is inserted into the thimble. The lower end of the thimble is then placed in a dish which contains a saturated solution of lithium hexafluoroarsenate in sulfolane. A lithium anode is suspended in the sulfolane solution. Leads from the carbon rod and the lithium are connected to a power source and to a volt meter and ammeter. The system is charged overnight at 4.65 volts. Short-circuit drain is performed and the current-time values are taken. After 3 hours and 10 minutes, a total of 1,162.70 milliamp-minutes is obtained. Throughout this period of time, recovery voltages are noted by a quick disconnecting of the short circuit drain. After 5 minutes of short-circuit drain the voltage readings rise to 3.8 volts in less than one second. After 3 hours and 10 minutes of short-circuit drain, when the short-circuit drain is disconnected, the voltage readings rise to 3.11 volts in less than one second. After a total of 3 hours and 36 minutes of short-circuit drain, the recovery voltage drops below 3 volts after the short-circuit drain is discontinued. At that time, a total of 1279.70 milliamp-minutes is obtained and discharge is terminated. At the point of termination, the short-circuit current is 4.4 milliamps. The average output during the time of short-circuit discharge is 5.92 milliamps. Based on an assumed working voltage of volts, the output is 63.98 milliwatt hours. Assuming the undoped cathode comprises 25% of the cell weight, the output of this cell is 72.62 watt-hours per pound.

EXAMPLE 4

In Example 4, a lithium anode is placed on a steel contact plate. A porous polypropylene separator is placed on top of the lithium anode. The separator is wet with a saturated solution of lithium hexafluoroarsenate in sulfolane. A cathode is prepared by mixing lithium hexafluoroarsenate, polyacetylene powder and graphite powder in a K-mill. The weight composition of the mixture is 43.7% polyacetylene, 50% lithium hexafluoroarsenate and 6.3% graphite powder. 6 milligrams of this mixture is compressed into a silvery disc and is then placed on top of the separator. A carbon brick contact is then placed on the disc. Leads are connected to the carbon brick contact and the steel anodic contact and these leads are connected to a power supply and to an ammeter and a volt meter. In this example, a constant current source is used at a 1 milliamp rate for both charge and discharge and voltage is monitored. For the first charge-discharge cycle, the time used is 15 minutes for the charge and 15 minutes for discharge. For the next 53 cycles, the time used for charge and discharge is 14 minutes for each. Voltage readings are taken at one minute intervals during charge and discharge. Cycling is discontinued after the 54th cycle for no reason other than the fact that, after 54 cycles, electrochemical efficiency of the cell is deemed to be near 100%. During the 54 cycles there is no evidence of any electrochemical inefficiency of the cell. The embodiment of mixing powdered lithium hexafluoroarsenate with polyacetylene powder is the invention of a colleague.

Representative cycling results are as follows:

TABLE I

| Minutes after charge or discharge | Cycle #1 Voltage Reading during charge | Cycle #1 Voltage Reading during discharge | Cycle #10 Voltage Reading during charge | Cycle #10 Voltage Reading during discharge | Cycle #20 Voltage Reading during charge |
|---|---|---|---|---|---|
| 1 | 4.07 | 3.46 | 3.98 | 3.27 | 3.89 |
| 2 | 4.08 | 3.32 | 4.02 | 3.13 | 4.09 |
| 3 | 4.10 | 3.21 | 4.03 | 3.00 | 4.14 |
| 4 | 4.12 | 3.11 | 4.06 | 2.85 | 4.20 |
| 5 | 4.14 | 3.01 | 4.08 | 2.64 | 4.25 |
| 6 | 4.15 | 2.88 | 4.12 | 2.35 | 4.30 |
| 7 | 4.16 | 2.69 | 4.16 | 1.95 | 4.37 |
| 8 | 4.18 | 2.37 | 4.22 | 1.53 | 4.46 |
| 9 | 4.20 | 1.90 | 4.29 | 1.10 | 4.56 |
| 10 | 4.24 | 1.41 | 4.37 | 0.85 | 4.69 |
| 11 | 4.28 | 0.99 | 4.46 | 0.68 | 4.83 |
| 12 | 4.33 | 0.77 | 4.56 | 0.54 | 4.94 |
| 13 | 4.39 | 0.58 | 4.68 | 0.43 | 5.03 |
| 14 | 4.46 | 0.41 | 4.80 | 0.36 | 5.08 |
| 15 | 4.52 | 0.30 | | | |

| Minutes after charge or discharge | Cycle #20 Voltage Reading during discharge | Cycle #40 Voltage Reading during charge | Cycle #40 Voltage Reading during discharge | Cycle #54 Voltage Reading during charge | Cycle #54 Voltage Reading during discharge |
|---|---|---|---|---|---|
| 1 | 3.54 | 3.98 | 3.46 | 3.98 | 3.24 |
| 2 | 3.33 | 4.27 | 3.13 | 4.22 | 2.83 |
| 3 | 3.16 | 4.38 | 2.82 | 4.40 | 2.42 |
| 4 | 3.01 | 4.47 | 2.44 | 4.52 | 2.08 |
| 5 | 2.81 | 4.54 | 2.15 | 4.60 | 1.94 |
| 6 | 2.62 | 4.60 | 1.96 | 4.66 | 1.63 |
| 7 | 2.37 | 4.65 | 1.71 | 4.73 | 1.39 |
| 8 | 2.12 | 4.69 | 1.41 | 4.81 | 1.16 |
| 9 | 1.94 | 4.74 | 1.15 | 4.89 | 0.94 |
| 10 | 1.67 | 4.78 | 0.99 | 4.97 | 0.80 |
| 11 | 1.36 | 4.83 | 0.90 | 5.05 | 0.70 |
| 12 | 1.08 | 4.88 | 0.82 | 5.12 | 0.62 |
| 13 | 0.94 | 4.92 | 0.75 | 5.16 | 0.54 |
| 14 | 0.84 | 4.96 | 0.68 | 5.20 | 0.44 |
| 15 | | | | | |

In several of the 54 cycles, the cell is allowed to stand in the charged state before discharge. In the tenth cycle, the cell stands for 1 hour after charging and before discharging. In each instance, standing after charging and before discharging causes the voltage, after 1 minute and 5 minutes during discharge, to be lower than would have been received. The effect on the voltage is small and temporary. In subsequent cycles, voltage recorded after 14 minutes during discharge recovers to previous values. This demonstrates that the cell does not lose capacity upon standing.

In comparison with this, a cell is constructed using 2 milligrams of polyacetylene film, a lithium anode and an electrolyte composed of a saturated solution of lithium hexafluorophosphate dissolved in sulfolane. The short-circuit currents are 8 to 10 millamps (32–40 milliamp/cm$^2$). After ten cycles, the cell stands in the discharge stage for two days. On the third day it is found that the polyacetylene film has lost its electrical conductivity.

EXAMPLE 5

The apparatus of Example 4 is used in this example. A cell is assembled as in Example 4 except that the electrolyte used is a 10% solution of lithium hexafluorophosphate dissolved in 3-methyl-sulfolane. Charge-discharge behavior is similar to that set forth in Example 4.

EXAMPLE 6

Using the procedure and apparatus set forth in Example 4, a cell is constructed using 10.4 milligrams of polyacetylene powder 10.4 milligrams of carbon black, 5.6 milligrams of dry lithium hexafluoroarsenate, and 8 milligrams of cheese cloth as the pressed disc cathode. The electrolyte is sulfolane saturated with lithium hexafluoroarsenate. The surface area of the disc is 0.85 cm$^2$. The cell is charged for 70 minutes at a rate of 3 milliamps (3.53 milliamps per cm$^2$). The cell is then discharged at 1 milliamp (1.18 milliamps per cm$^2$). The voltage is seen to drop from 3.8 volts to 3.1 volts for the first hour during discharge and after an additional 45 minutes the voltage drops to 2.45. After a total of 2 hours and 5 minutes of discharge, the voltage abruptly falls off signaling the end of life of the cell.

EXAMPLE 7

The apparatus of Example 4 and the procedure of Example 4 is again used. The cathode is a pressed disc which is composed of 30 milligrams of carbon black, 15 milligrams of dry hexafluoroarsenate, 15 milligrams of polyacetylene powder and 7 milligrams of cheese cloth. The electrolyte is a staturated solution of lithium hexafluoroarsenate in sulfolane. The cell is charged at a rate of 10 milliamps (11.8 milliamps per cm$^2$) for 20 minutes until the voltage reaches 5 volts. Thereafter the charge rate is reduced to keep the voltage below 5 volts. After 1 hour and 45 minutes of charge, the cell is discharged at 1 milliamp (1.18 milliamps per cm$^2$) and the voltages are recorded. For the first 45 minutes of discharge the voltage falls from 3.74 volts to 3.27 volts. At that point, the end of life of the cell is noted as the voltage falls rapidly from 3.27 volts to 0.00 volts. It is found however that the drain rate is actually higher than that indicated above. The drain rate is reduced due to a light short circuit wich places an additional drain on the cell beyond the 1.18 milliamps per cm$^2$).

While this invention has been described in terms of certain preferred embodiments and illustrated by means of specific examples, the invention is not to be construed as limited except as set forth in the following claims.

I claim:

1. A substantially anhydrous cell comprising an anode, an improved polyacetylene cathode, an electrolyte capable of p-doping the improved cathode, and an organic solvent for said electrolyte, said improved cathode being insoluble in said solvent when the cathode is either undoped or p-doped, said solvent being stable to electrochemical decomposition and said anode and said solvent being substantially inert to one another, said improved polyacetylene cathode comprising a mixture of polyacetylene and an electrically conductive material, said conductive material being present in an amount of from about 5% to about 75% base on the total weight of the cathode.

2. A substantially anhydrous cell according to claim 1 wherein said cathode contains polyacetylene powder.

3. A substantially anhydrous cell according to claim 1 wherein said conductive material is carbon.

4. A substantially anhydrous cell according to claim 1 wherein said conductive material is a mixture of carbon black and graphite.

5. A substantially anhydrous cell according to claim 1 wherein said cathode comprises polyacetylene powder, carbon black and graphite.

6. A substantially anhydrous cell according to claim 1 wherein said conductive material has an electrical conductivity of at least about $10^{-6}(ohm-cm)^{-1}$.

7. A substantially anhydrous cell according to claim 1 wherein said anode is selected from the class consisting of lithium, aluminum, sodium and magnesium.

8. A substantially anhydrous cell according to claim 1 wherein said anode is lithium.

9. A substantially anhydrous cell according to claim 1 wherein said solvent is sulfolane or 3-methyl sulfolane.

10. A substantially anhydrous cell according to claim 1 wherein said solvent is propylene carbonate.

11. A substantially anhydrous cell according to claim 1 wherein said electrolyte is a metal salt and said anode is a metal and the metal portion of the metal salt is the same as the metal of the anode.

12. A substantially anhydrous cell according to claim 1 wherein said anode is lithium and said electrolyte is lithium hexafluorophosphate.

13. A substantially anhydrous cell according to claim 1 wherein said cathode is hexafluorophosphate doped.

14. A substantially anhydrous cell according to claim 1 wherein said cathode is hexafluoroarsenate doped.

15. A substantially anhydrous cell according to claim 1 wherein said cathode is perchlorate doped.

16. A substantially anhydrous cell according to claim 1 wherein said cathode is fluorosulfonate doped.

17. A substantially anhydrous cell according to claim 1 wherein said cathode is trifluoromethanesulfonate doped.

18. A substantially anhydrous cell according to claim 1 wherein said anode is lithium, said electrolyte is lithium hexafluororphosphate and said solvent is sulfolane.

19. A substantially anhydrous cell according to claim 1 wherein said solvent is selected from the class consisting of sulfones, ethers, organic carbonates, esters, lactones, and organic sulfites.

20. A substantially anhydrous cell according to claim 1 wherein said solvent is selected from the class consisting of sulfolane, 3-methylsulfolane, tetrahydrofuran, 2-methyltetrahydrofuran, dioxolane, dioxane, dimethoxyethane, bis(methoxyethyl) ether, propylene carbonate, methyl formate, butyrolactone, and dimethyl sulfite.

21. A cell comprising an anode, an improved cathode, an electrolyte capable of p-doping the improved cathode, and an organic solvent for said electrolyte, said improved cathode being insoluble in said solvent when said cathode is either undoped or p-doped, said solvent being stable to electrochemical decomposition, said anode and said solvent being substantially inert to one another, said cell being substantially anhydrous, and wherein said improved cathode comprises a mixture of polyacetylene and an electrically conductive material, and said conductive material being present in an amount of from about 5% to about 75% based on the total weight of the cathode.

* * * * *